US006999960B2

(12) United States Patent
Daily et al.

(10) Patent No.: US 6,999,960 B2
(45) Date of Patent: Feb. 14, 2006

(54) APPARATUS AND METHOD TO COORDINATE REQUESTS PROVIDED TO A DATA STORAGE AND RETRIEVAL SYSTEM

(75) Inventors: Thomas Holderness Daily, Pinetop, AZ (US); James Arthur Fisher, Tucson, AZ (US); Ralph Thomas Jackson, Tucson, AZ (US); Jeffrey Wayne Pilch, Tucson, AZ (US); Timothy Clyde Sample, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 10/226,569

(22) Filed: Aug. 23, 2002

(65) Prior Publication Data

US 2004/0039739 A1    Feb. 26, 2004

(51) Int. Cl.
*G06F 17/30* (2006.01)
(52) U.S. Cl. .............................. 707/5; 707/9; 715/840
(58) Field of Classification Search .................... 707/2, 707/3, 5, 9; 715/840; 348/231.99
See application file for complete search history.

(56) References Cited

U.S. PATENT DOCUMENTS

| | | | |
|---|---|---|---|
| 5,008,853 A | 4/1991 | Bly et al. ................... 364/900 |
| 5,119,319 A | 6/1992 | Tanenbaum ................. 364/514 |
| 6,061,686 A | 5/2000 | Gauvin et al. ................ 707/10 |
| 6,070,177 A | 5/2000 | Kao et al. .................... 707/901 |
| 6,151,708 A | 11/2000 | Pedrizetti et al. ............. 717/11 |
| 6,606,619 B2 * | 8/2003 | Ortega et al. .................. 707/2 |

* cited by examiner

*Primary Examiner*—Jeffrey Gaffin
*Assistant Examiner*—Hassan Mahmoudi
(74) *Attorney, Agent, or Firm*—Dale F. Regelman

(57) ABSTRACT

A method to coordinate requests submitted to a data storage and retrieval system from two or more operator input stations, whereby an initialization request comprising a requested operation is provided at a first time to the data storage and retrieval system. At that first time the method provides a current history of previously-submitted commands to perform the requested operation. The method also generates a request history token at that first time. The first history is displayed to the user. The user then determines if the current history includes the requested operation. If the first history does not include the requested operation, the user at a second time submits a command to perform the requested operation. The method generates at that second time a current history token, and determines if the current history token matches the request history token. If the current history token matches the request history token, then the method performs the requested operation.

23 Claims, 4 Drawing Sheets

APPARATUS AND METHOD TO COORDINATE REQUESTS PROVIDED TO A DATA STORAGE AND RETRIEVAL SYSTEM

FIELD OF THE INVENTION

Applicants' invention relates to an apparatus and method to coordinate requests provided to a data storage and retrieval system, where that data storage and retrieval system is capable of communicating with two or more operator input stations.

BACKGROUND OF THE INVENTION

Automated media storage libraries are known for providing cost effective access to large quantities of stored information. Generally, media storage libraries include a large number of storage slots in which are stored portable information storage media. The typical portable data storage media is a tape cartridge, an optical cartridge, a disk cartridge, electronic storage media, and the like. By electronic storage media, Applicants mean a device such as a PROM, EPROM, EEPROM, Flash PROM, and the like.

One (or more) accessors typically retrieve the data storage media from the storage slots and deliver the accessed media to an input/output device for reading and/or writing data on the accessed media. Suitable electronics operate the accessor(s) and operate the input/output device(s) to provide information to, and/or to receive information from, one or more attached online host computer systems.

Prior art data storage and retrieval systems include a single operator input station which allows a user to view the operation and status of the library. Applicants' data storage and retrieval system includes at least one local operator input station. In addition, however, Applicants' data storage and retrieval system is capable of communicating with one or more remote operator input stations. Thus, both local and remote users can submit requests to Applicants' data storage and retrieval system.

SUMMARY OF THE INVENTION

Applicants' invention includes a method to coordinate requests submitted to a data storage and retrieval system capable of communicating with two or more operator input stations, where each of those two or more operator input stations includes a display device. Applicants' method includes submitting an initialization request to the data storage and retrieval system, where that initialization request includes a request to perform an operation. Applicants' method then displays a history of previously-performed requests which include that operation. Applicants' method also provides a request history token. That request history token is optionally displayed.

By reviewing the displayed history, the submitter can verify that the operation to be requested has not already been performed. If the requested operation has not already been performed, the submitter may submit a command to perform the requested operation, along with the request token previously provided on initialization. Upon receipt of the action request and the request history token, Applicants' method generates a current history token and verifies that the request history token matches that current history token. If those history tokens match, then Applicants' method performs the requested operation. If the history tokens do not match, suggesting that another user has already submitted the same or similar action request, the submitter's command to perform the requested operation is rejected.

Applicants' invention further includes an article of manufacture comprising a computer useable medium having computer readable program code disposed therein to coordinate requests submitted to a data storage and retrieval system from two or more operator input stations. Applicants' invention further includes a computer program product usable with a programmable computer processor having computer readable program code embodied therein to coordinate requests submitted to a data storage and retrieval system capable of communicating with two or more operator input stations.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Referring to the illustrations, like numerals correspond to like parts depicted in the figures. The invention will be described as embodied in an automated data storage and retrieval subsystem for use in a data processing environment. The following description of Applicants' apparatus and method is not meant, however, to limit Applicants' invention to data storage and retrieval systems, as the invention herein is generally useful to coordinate the operation of a computer system which is capable of receiving requests from multiple sources.

Figure 1:
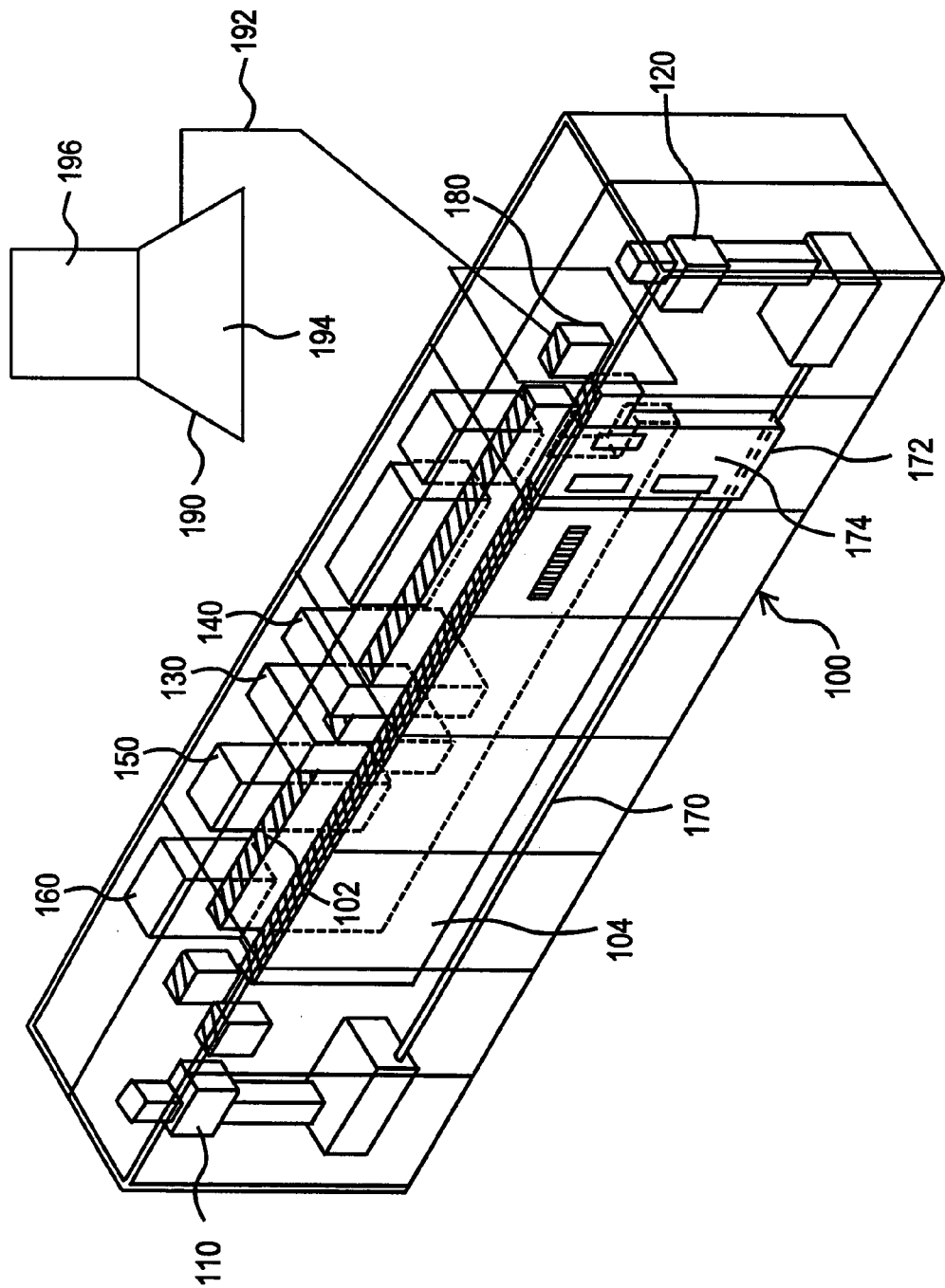
FIG. 1 is a perspective view of a first embodiment of Applicants' data storage and retrieval system.

Referring now to FIG. 1, automated data storage and retrieval system 100 is shown having a first wall of storage slots 102 and a second wall of storage slots 104. Portable data storage media are individually stored in these storage slots. In certain embodiments, such data storage media are individually housed portable housings, i.e. cartridges. Examples of such data storage media include magnetic tapes, magnetic disks of various types, optical disks of various types, electronic storage media, and the like.

Applicants' automated data storage and retrieval system includes one or more accessors, such as accessors 110 and 120. An accessor is a robotic device which retrieves portable data storage media from, for example, first storage wall 102 or second storage wall 104, transports that accessed media to, for example, input/output device 130 or 140 for reading and/or writing data thereon, and returns the media, for example, to a proper storage slot. As shown in FIG. 1, accessors 110 and 120 travel bi-directionally along rail 170 in an aisle disposed between first wall of storage slots 102 and second wall of storage slots 104. U.S. Pat. No. 6,038, 490, entitled "Automated Data Storage Dual Picker Interference Avoidance," teaches a method to prevent collisions occurring between accessors moveably disposed on the same rail system, and is hereby incorporated by reference herein. Import/export station 172 includes access door 174 pivotably attached to the side of system 100. Portable data storage cartridges can be placed in the system, or in the alternative, removed from the system, via station 172 and access door 174.

Library controller 160 comprises electronics and computer code to operate the various components comprising library 100. In certain of these embodiments, library controller 160 is integral with a computer. Local operator input station 150 permits a local user to communicate with Applicants' automated data storage and retrieval system 100. Local operator input station 150 includes an information input device 154 (not shown in FIG. 1) and an information display device 156 (not shown in FIG. 1). Communication server 180 allows one or more remote users to communicate with system 100. For example, remote operator input station 190 communicates with server 180 via communication link 192. Remote operator input station 190 includes an information input device 194 and an information display device 196.

Communication link 192 comprises a serial interconnection, such as an RS-422 cable/RS-232 cable, a SCSI interconnection, an ethernet interconnection, a gigabit ethernet interconnection, a Fibre Channel interconnection, an ESCON interconnection, a local area network, a private wide area network, a public wide area network, and combinations thereof. Although FIG. 1 shows a single remote operator input station, other embodiments of Applicants' system 100 includes two or more remote operator input stations.

Figure 2A:
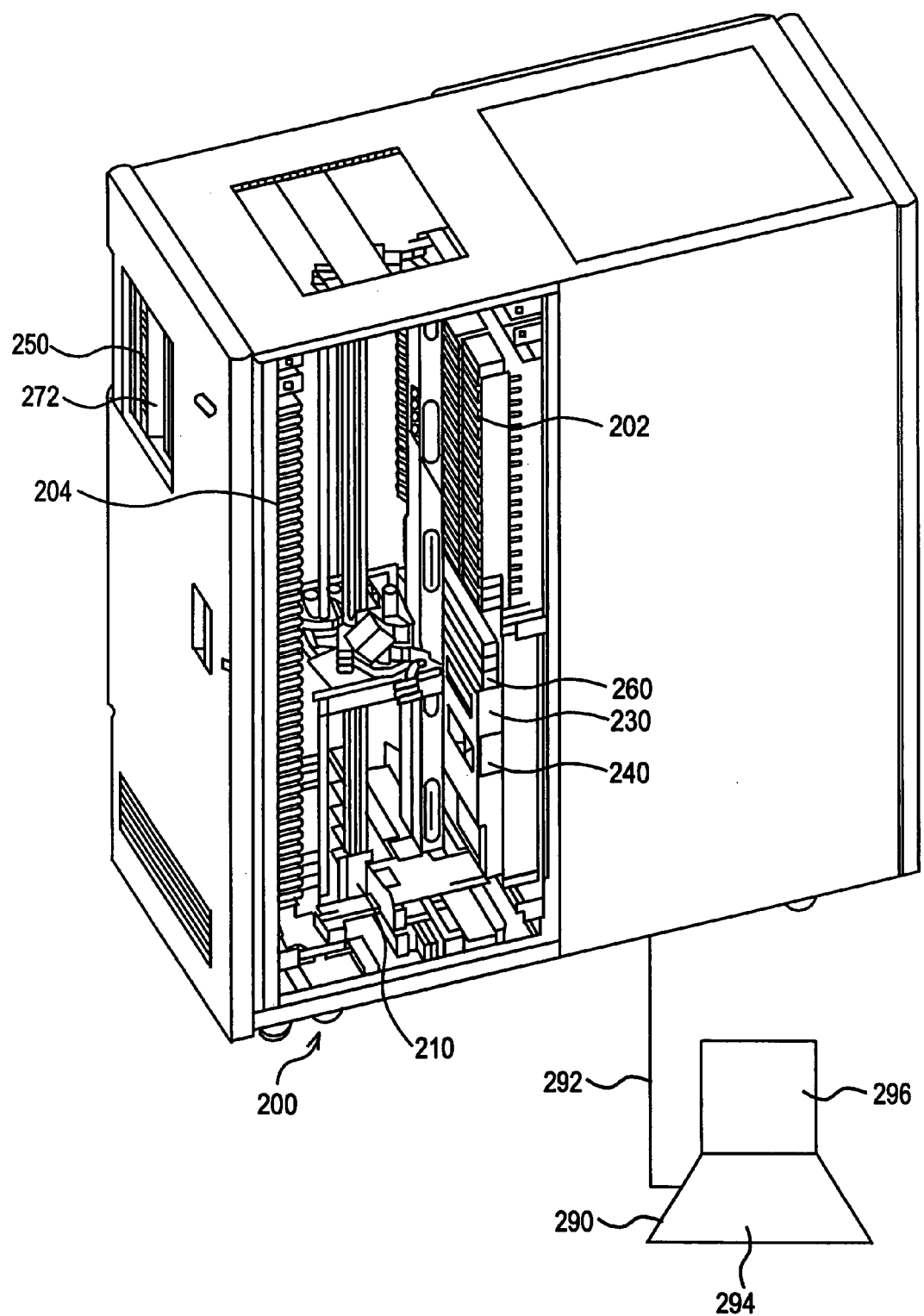
FIG. 2A is a first perspective view of a second embodiment of Applicants' data storage and retrieval system.

FIG. 2A shows system 200 which comprises another embodiment of Applicants' data storage and retrieval system. System 200 includes first storage wall 202 and second storage wall 204. Storage walls 202 and 204 each include a plurality of storage elements in which can be stored a plurality of portable data storage media. System 200 includes one or more input/output devices, such as devices 230 and 240. Input/output device 230/240 each comprise a floppy disk drive, an optical disk drive, a magnetic tape drive, and the like. System 200 further includes controller 260. System 200 further includes control panel 250 and import/export station 272.

As those skilled in the art will appreciate, one or a plurality of portable data storage cartridges can be removeably disposed in one or more slots in storage walls 202/204. Each such cartridge contains an information storage medium internally disposed therein. Such data storage media includes optical media, magnetic media, tape media, electronic media, and combinations thereof. System 200 also includes at least one robotic accessor 210 for transporting a designated portable information storage medium between a storage slot disposed in first wall 202 or second wall 204 and input/output device 230/240.

Data storage and retrieval system 200 further includes one or more remote operator input stations, such as remote operator input station 290. Remote operator input station 290 includes an information input device 294 and an information display device 296.

Figure 2B:
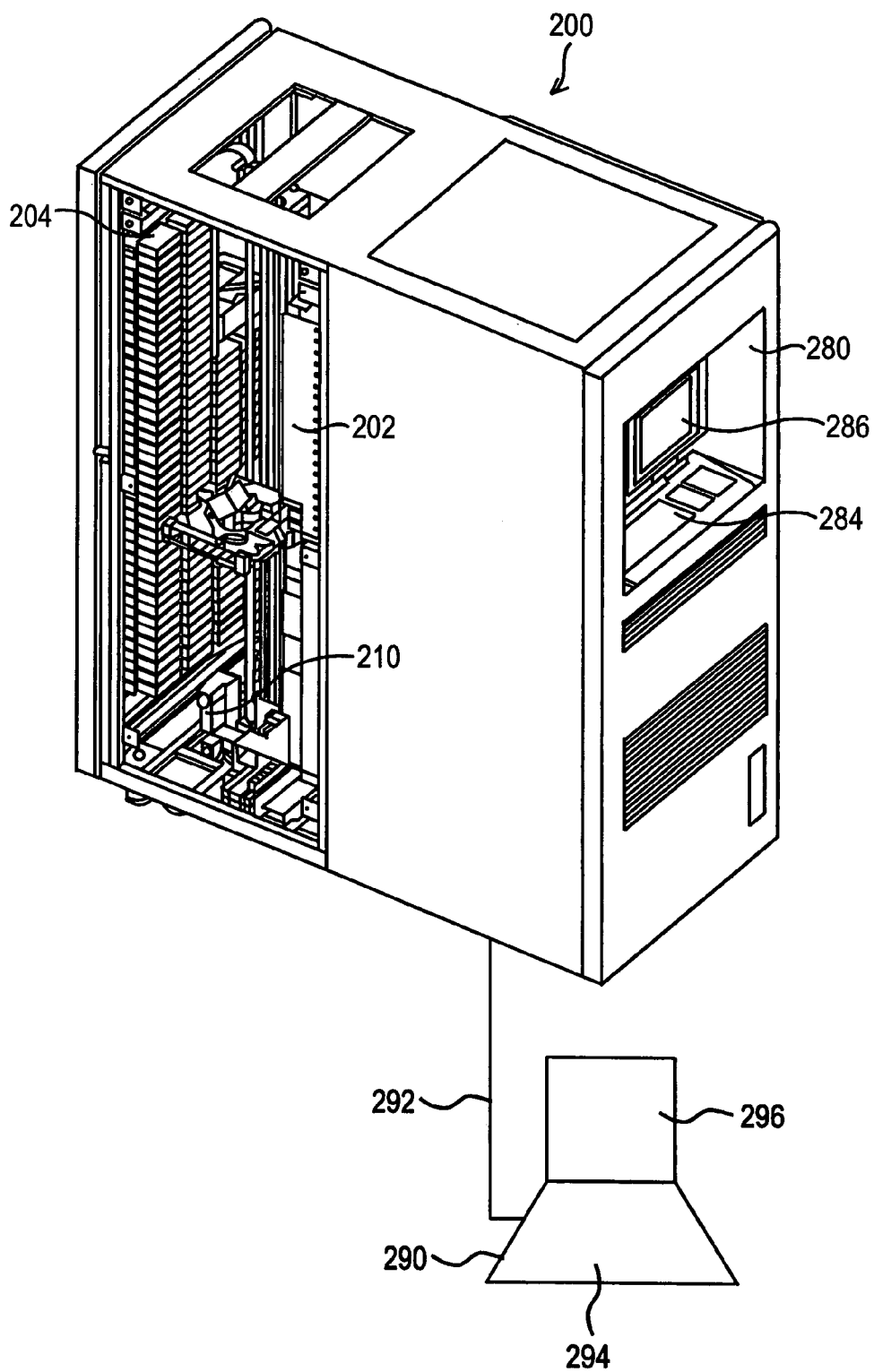
FIG. 2B is a second perspective view of the second embodiment of Applicants' data storage and retrieval system.

Remote operator input station 290 communicates with system 200 via communication link 292. Communication link 292 comprises a serial interconnection, such as an RS-422 cable/RS-232 cable, a SCSI interconnection, an ethernet interconnection, a gigabit ethernet interconnection, a Fibre Channel interconnection, an ESCON interconnection, a local area network, a private wide area network, a public wide area network, and combinations thereof. Although FIG. 2A shows a single remote operator input station, other embodiments of Applicants' system 200 includes two or more remote operator input stations. Referring now to FIG. 2B, system 200 further includes local operator input station 280 (FIG. 2B). Local operator input station 280 includes an information input device 284 (FIG. 2B) and an information display device 286 (FIG. 2B).

Because Applicants' data storage and retrieval system includes at least one local operator input station and at least one remote operator input station, multiple users can request the data storage and retrieval system perform multiple operations simultaneously. This being the case, a method is needed to prevent such multiple users from requesting duplicative or conflicting actions. Applicants' invention includes a method to coordinate requests submitted to a data storage and retrieval system capable of communicating with two or more operator input stations. In certain embodiments, a first user submits requests to Applicants' data storage and retrieval system using a first operator input station and a second operator submits requests to Applicants' data storage and retrieval system using a second operator input station. In certain embodiments, both the first operator and the second operators are natural persons. In certain embodiments, the first operator, the second operator, or both, comprise one or more computers, such one or more host computers. Each such one or more computers may comprise, for example, one or more personal computers, one or more workstations, one or more mainframe computers, and combinations thereof.

Figure 3:
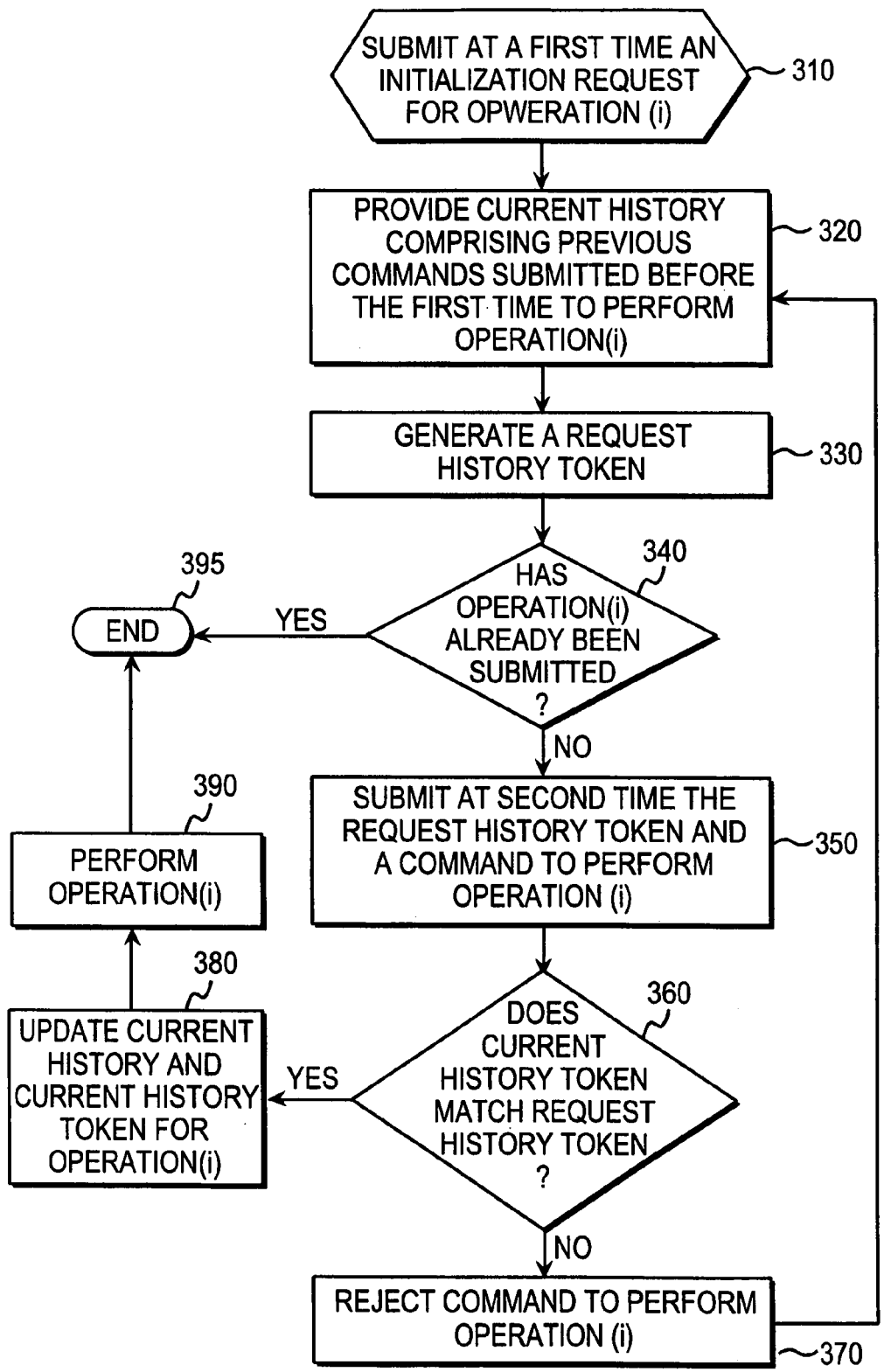
FIG. 3 is a flow chart summarizing the steps of Applicants' method.

FIG. 3 summarizes the steps of Applicants' method. In step 310, a first user, at a first time, using a first operator input station, submits an initialization request to the data storage and retrieval system, where that initialization request includes operation(i). Operation(i) may comprise, for example, importing and/or exporting one or more physical/logical volumes into, and/or out of, the system, changing the category assigned to one or more physical/logical volumes, modifying access authorization for one or more physical/logical volumes, obtaining a stacked volume map, and the like.

In certain embodiments, the initialization request is submitted using the local operator input station, such as local operator input station 150 (FIG. 1) or local operator input station 280 (FIG. 2B). In certain embodiments, the initialization request is submitted using a remote operator input station, such as remote operator input station 190 (FIG. 1) or remote operator input station 290 (FIGS. 2A, 2B).

In step 320, Applicants' method displays a current history which includes (N) previous commands received before the first time by the data storage and retrieval system to perform operation(i). In certain embodiments, the value of (N) is set by the requesting user. In certain embodiments, the value of (N) is determined by time elements, i.e. the requests for operation(i) made within the last hour, or day, or designated number of days, and the like. In certain embodiments, the value for (N) is set at a fixed number, such as 1, 10, 20, 50, 100, and the like. In certain embodiments, the system user can set such a fixed value at system start-up. In certain embodiments, the value of (N) is set in "firmware" developed by the system vendor.

In step 320, Applicants' method displays the current history on the display device, such as display device 156, 196 (FIG. 1), 286 (FIG. 2B), 296 (FIGS. 2A, 2B), disposed in the first operator input station. In step 330, Applicants' method generates a request history token. In certain embodiments of Applicants' method, step 330 includes displaying the request history token.

In certain embodiments, the request history token comprises a time stamp representing the last time the data storage and retrieval system performed operation(i). In certain embodiments, Applicants' data storage and retrieval system includes a counter specific to each available operation. In these counter embodiments, counter(i) comprises the counter corresponding to operation(i). Each time the data storage and retrieval system receives a command to perform operation(i), the counter value for counter(i) is incremented. In these counter embodiments, the request history token of step 330 comprises the counter value for counter(i) at the first time.

In step 340, the first user examines the displayed current history to determine if a command to perform operation(i) has already been submitted by another user. If the first user determines in step 340 that another user has already submitted a command to perform operation(i), then the first user takes no further action, and Applicants' method ends in step 395. Alternatively, if the first user determines in step 340 that another user has not submitted a command to perform operation(i), then in step 350 the first user, at a second time, submits a command to perform operation(i) along with the request history token.

In step 360, Applicants' method generates at the second time a current history token, and determines if the request history token matches that current history token. In certain embodiments, the current history token comprises the counter value at the second time for counter(i). If Applicants' method determines in step 360 that the request history token matches the current history token, then Applicants' method transitions from step 360 to step 380 wherein the current history for operation(i) is updated, and wherein the current history token for operation(i) is updated. Applicants' method transitions from step 380 to step 390 wherein Applicants' data storage and retrieval system performs the requested operation. Applicants' method then transitions from step 390 to step 395.

If Applicants' method determines in step 360 that the request history token does not match the current history token, then Applicants' method transitions from step 360 to step 370 wherein the command to perform operation(i) is rejected. Thereafter, Applicants' method transitions from step 370 to step 320 wherein a new current history for operation(i) is displayed.

In certain embodiments, one or more individual steps in Applicants' method may be combined, eliminated, or reordered. Applicants' invention further includes an article of manufacture comprising a computer useable medium having computer readable program code disposed therein for coordinating requests submitted to a data storage and retrieval system, where the data storage and retrieval system is capable of communicating with two or more operator input stations. Applicants' data storage and retrieval systems 100 and 200 each comprise such an article of manufacture. Applicants' invention further includes a computer program product usable with a programmable computer processor having computer readable program code embodied therein to coordinate requests submitted to a data storage and retrieval system capable of communicating with two or more operator input stations.

While the preferred embodiments of the present invention have been illustrated in detail, it should be apparent that modifications and adaptations to those embodiments may occur to one skilled in the art without departing from the scope of the present invention as set forth in the following claims.

We claim:

1. A data storage and retrieval system comprising a local operator input station, wherein said local operator input station comprises an information input device and an information display device, and a computer useable medium having computer readable program code disposed therein to coordinate requests submitted to said data storage and retrieval system, the computer readable program code comprising a series of computer readable program steps to effect:

receiving an initialization request at a first time from said local operator input stations, wherein said initialization request comprises a requested operation, wherein said requested operation is selected from the group consisting of importing and/or exporting one or more physical/logical volumes into or out of the system, changing the category assigned to one or more physical logical volumes, modifying access authorization for one or more physical/logical volumes, and obtaining a stacked volume map;

providing to said local operator input station a current history comprising previous commands received by said data storage and retrieval system to perform said requested operation;

generating at said first time a request history token;

receiving at a second time a command to perform said requested operation;

generating at said second time a current history token; and operative if said request history token matches said current history token, performing said requested operation.

2. The article of manufacture of claim 1, further comprising a series of computer readable program steps to effect updating said current history.

3. The article of manufacture of claim 2, further comprising a series of computer readable program steps to effect updating current history token.

4. The article of manufacture of claim 1, wherein said computer readable program code further comprises a series of computer readable program steps to effect displaying said current history.

5. The article of manufacture of claim 4, wherein said computer readable program code further comprises a series of computer readable program steps to effect:

displaying said request history token; and displaying said current history token.

6. The article of manufacture of claim 1, wherein said computer readable program code further comprises a series of computer readable program steps to effect rejecting said command if said request history token does not match said current history token.

7. The article of manufacture of claim 1, further comprising a counter for said requested operation, wherein said counter has a counter value, wherein said computer readable program code further comprises a series of computer readable program steps to effect incrementing said counter value each time said data storage and retrieval system receives a command to perform said requested operation.

8. The article of manufacture of claim 7, wherein said request history token comprises said counter value at said first time, and wherein said current history token comprises said counter value at said second time.

9. An article of manufacture comprising a computer useable medium having computer readable program code disposed therein for coordinating requests submitted to a data storage and retrieval system, wherein said data storage and retrieval system comprises a local operator input station, wherein said local operator input station comprises an information input device and an information display device, the computer readable program code comprising a series of computer readable program steps to effect:

receiving an initialization request at a first time from said local operator input station, wherein said initialization request comprises a requested operation, wherein said requested operation is selected from the group consisting of importing and/or exporting one or more physical/logical volumes into or out of the system, changing the category assigned to one or more physical logical volumes, modifying access authorization for one or more physical/logical volumes, and obtaining a stacked volume map;

providing to said local operator input station a current history comprising (N) previous commands submitted before said first time to said data storage and retrieval system to perform said requested operation;

generating at said first time a request history token;

receiving a command at a second time to perform said requested operation;

generating at said second time a current history token;

determining if said request history token matches the current history token;

operative if said current history token matches said request history token, performing said requested operation;

operative if said current history token does not match said request history token, rejecting said command.

10. A method to coordinate requests submitted to a data storage and retrieval system, comprising the steps of:

providing a data storage and retrieval system comprising a local operator input station, wherein said local operator input station comprises an information input device and an information display device;

submitting at a first time to said data storage and retrieval system using said local operator input station an initialization request, wherein said initialization request comprises a requested operation, wherein said requested operation is selected from the group consisting of importing and/or exporting one or more physical/logical volumes into or out of the system, changing the category assigned to one or more physical logical volumes, modifying access authorization for one or more physical/logical volumes, and obtaining a stacked volume map;

providing a current history comprising previous commands received before said first time to said data storage and retrieval system to perform said requested operation;

generating a request history token at said first time;

examining said current history to determine if a command to perform the requested operation has already been submitted by another user;

operative if another user has not submitted a command to perform the requested operation, submitting at a second time a command to perform said requested operation;

generating a current history token at said second time;

comparing said request history token with said current history token; and operative if said request history token matches said current history token, performing said requested operation.

11. The method of claim 1, further comprising the step of updating said current history.

12. The method of claim 11, further comprising the step of updating said current history token.

13. The method of claim 1, further including the step of displaying said current history.

14. The method of claim 1, wherein said determining step and said submitting steps are performed by a natural person.

15. The method of claim 1, wherein said request history token does not match said current history token, further comprising the step of rejecting said command.

16. The method of claim 1, further comprising the steps of:

providing a counter for said requested operation, wherein said counter comprises a counter value;

incrementing said counter value each time said data storage and retrieval system receives a command to perform said requested operation;

wherein said request history token comprises said counter value at said first time, and wherein said current history token comprises said counter value at said second time.

17. A method to coordinate requests submitted to a data storage and retrieval system, comprising the steps of:

providing a data storage and retrieval system comprising a local operator input station, wherein said local operator input station comprises an information input device and an information display device;

submitting at a first time to said data storage and retrieval system using said local operator input stations an initialization request, wherein said initialization request comprises a requested operation, wherein said requested operation is selected from the group consisting of importing and/or exporting one or more physical/logical volumes into or out of the system, changing the category assigned to one or more physical logical volumes, modifying access authorization for one or more physical/logical volumes, and obtaining a stacked volume map;

providing a counter for said requested operation, wherein said counter comprises a counter value;

incrementing said counter value each time said data storage and retrieval system receives a command to perform said requested operation;

displaying on the display device disposed in said first operator input station a current history comprising (N) previous commands performed by said data storage and retrieval system before said first time, wherein each of said (N) previous commands comprise said requested operation;

generating a request history token, wherein said request history token comprises said counter value at said first time;

examining said current history to determine if a command to perform the requested operation has already been submitted by another user;

operative if another user has not submitted a command to perform the requested operation, submitting at a second time a command to perform said requested operation;

generating a current history token, wherein said current history token comprises said counter value at said second time;

determining if said request history token matches the current history token; and operative if said request history token matches said current history token, performing said requested operation;

operative if said request history token does not match said current history token, rejecting said command.

18. A computer program product usable with a programmable computer processor having computer readable program code embodied therein to coordinate requests submitted to a data storage and retrieval system comprising a local operator input station, wherein said local operator input station comprises an information input device and an information display device, comprising:

computer readable program code which causes said programmable computer processor to receive an initialization request at a first time from said local operator input station, wherein said initialization request comprises a requested operation, wherein said requested operation is selected from the group consisting of importing and/or exporting one or more physical/logical volumes into or out of the system, changing the category assigned to one or more physical logical volumes, modifying access authorization for one or more physical/logical volumes, and obtaining a stacked volume map;

computer readable program code which causes said programmable computer processor to provide a current history, wherein said current history comprises previous commands submitted before said first time to said data storage and retrieval system to perform said requested operation;

computer readable program code which causes said programmable computer processor to generate at said first time a request history token;

computer readable program code which causes said programmable computer processor to receive at a second time a command to perform said requested operation;

computer readable program code which causes said programmable computer processor to generate at said second time a current history token;

computer readable program code which causes said programmable computer processor to determine if said request history token matches said current history token; and computer readable program code which causes said programmable computer processor to perform said requested operation if said request history token matches said current history token.

19. The computer code product of claim 18, further comprising computer readable program code which causes said programmable computer processor to display said current history.

20. The computer code product of claim 18, further comprising computer readable program code which causes said programmable computer processor to reject said command if said current history token does not match said request history token.

21. The computer code product of claim 18, further comprising computer readable program code which causes said programmable computer processor to update said current history.

22. The computer code product of claim 18, further comprising computer readable program code which causes said programmable computer processor to update said current history token.

23. A computer program product usable with a programmable computer processor having computer readable program code embodied therein to coordinate requests submitted to a data storage and retrieval system comprising a local operator input station, wherein said local operator input station comprises an information input device and an information display device, comprising:

computer readable program code which causes said programmable computer processor to receive an initialization request at a first time from a first said local operator input station, wherein said initialization request comprises an operation, wherein said requested operation is selected from the group consisting of importing and/or exporting one or more physical/logical volumes into or out of the system, changing the category assigned to one or more physical logical volumes, modifying access authorization for one or more physical/logical volumes, and obtaining a stacked volume map;

computer readable program code which causes said programmable computer processor to provide a current history to said local operator input station, wherein said current history comprises the (N) previous commands submitted before said first time to said data storage and retrieval system to perform said requested operation;

computer readable program code which causes said programmable computer processor to generate at said first time a request history token;

computer readable program code which causes said programmable computer processor to receive at a second time from said first operator input station a command to perform said requested operation;

computer readable program code which causes said programmable computer processor to create at said second time a current history token;

computer readable program code which causes said programmable computer processor to determine if said request history token matches said current history token; and computer readable program code which, if said current history token matches said request history token, causes said programmable computer processor to perform said requested operation; and computer readable program code which, if said current history token does not match said request history token, causes said programmable computer processor to reject said command.

* * * * *